March 4, 1924.

A. P. McKAY

PLOW

Filed Dec. 7, 1922

Inventor

A. P. McKay

By Seymour & Bright

Attorneys

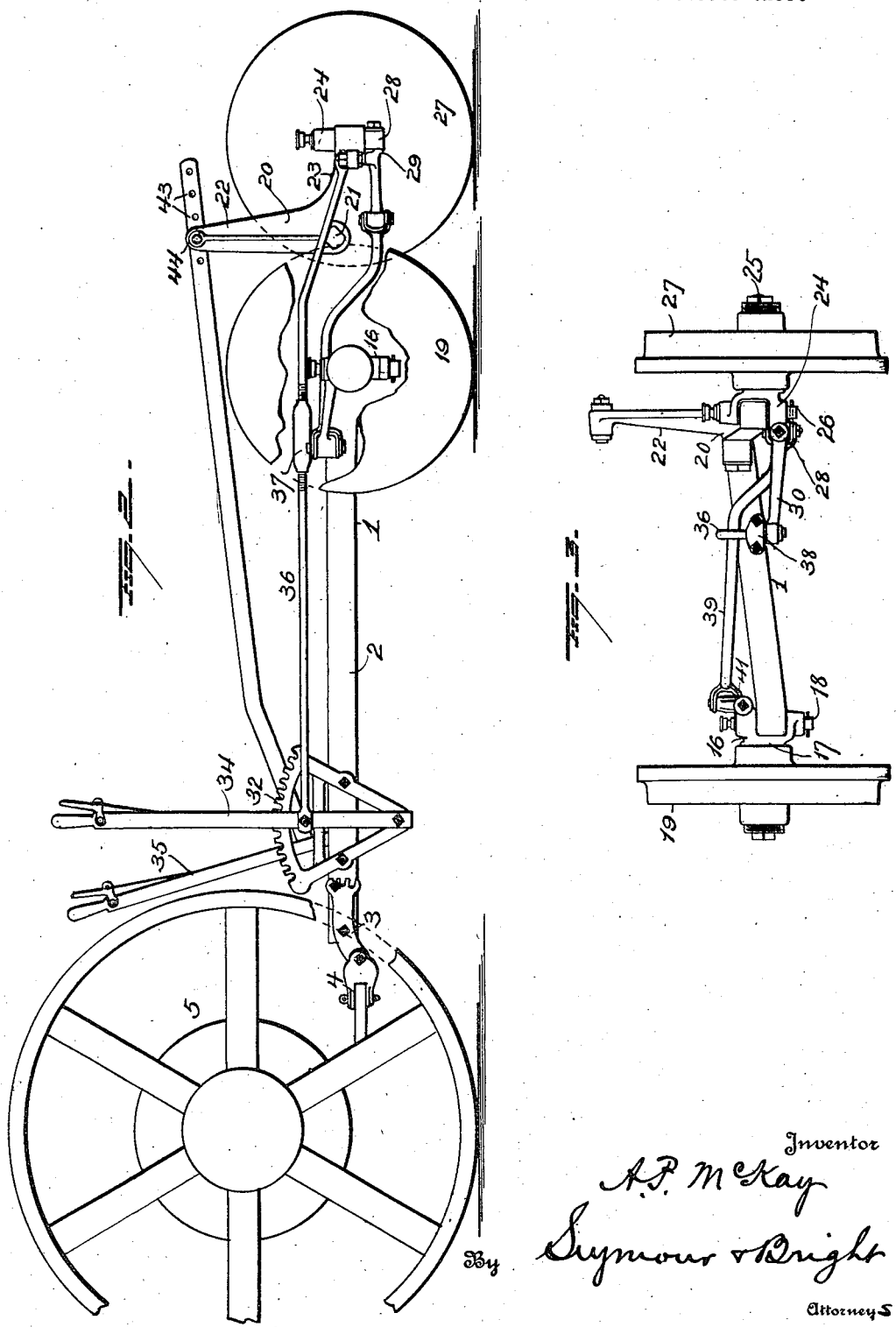

Patented Mar. 4, 1924.

1,485,423

UNITED STATES PATENT OFFICE.

AUGUSTA P. McKAY, OF ROME, GEORGIA, ASSIGNOR TO OLIVER CHILLED PLOW WORKS, OF SOUTH BEND, INDIANA.

PLOW.

Application filed December 7, 1922. Serial No. 605,413.

*To all whom it may concern:*

Be it known that I, AUGUSTA P. McKAY, a citizen of the United States, and a resident of Rome, in the county of Floyd and State of Georgia, have invented certain new and useful Improvements in Plows; and I do hereby declare the following to be a full, clear, and exact description of the invention, such as will enable others skilled in the art to which it appertains to make and use the same.

This invention relates to improvements in plows and more particularly to such as are known in the art as "disk plows," one object of the invention being to so construct a disk plow that it shall embody a simple frame structure mounted on an intermediate land wheel and a rear furrow wheel and having no intermediate furrow wheel, the construction being such that it shall be supported in working position by reason of its connection with a tractor.

A further object is to so construct a disk plow of the character above outlined, that the two wheels may be angled simultaneously by means of a hand lever located at the forward end of the structure.

A further object is to construct a gang plow in such manner, that it may be raised or lowered and adjusted for uniform depth of plowing with the use of a single lever connected with only one of the wheels of the plow.

A further object is to so construct a plow mounted on a rear and a side wheel, that both of said wheels shall be capable of being angled relatively to the line of draft, and so that one only of said wheels shall be also capable of such cooperation with the frame and the ground that the frame may be raised or lowered and adjusted for depth of plowing of the earth working elements without interfering with the angling of said wheel and to provide levers at the forward end of the structure for operating the angling of the wheels and the raising or lowering of the plow frame.

A further object is to construct a disk plow in such manner that the proper width of cutting of the earth engaging elements on a hill-side shall be insured and so as to counteract the tendency of the plow to drift down hill.

A further object is to provide a frame having a general triangular shape with its forward corner adapted for connection with the hitch of a tractor, its rear corner mounted on a rear furrow wheel approximately in line with the forward corner, and its lateral corner mounted on a land wheel, whereby the hitch corner and the rear furrow wheel corner shall be properly located with respect to each other and to the bearings of disks attached to intermediate portions of said frame, whereby the uniform raising and lowering of the disks with relation to each other and with relation to the tractor and land wheel shall be insured, when the raising and lowering is effected at only the rear end of the triangular frame.

With these and other objects in view, the invention consists in certain novel features of construction and combinations of parts as hereinafter set forth and pointed out in the claims.

In the accompanying drawings;

Figure 1 is a plan view of a disk plow embodying my improvements;

Figure 2 is a side elevation of the same with the earth working disks omitted, and Figure 3 is a rear view.

The frame of the plow is indicated at 1 and has a general triangular shape,—the corners of which may be assumed to be at the points *a*, *b* and *c*, and said frame may be made in a single casting. The forward portion of the frame constitutes a draft bar 2 and this is to be connected, by hitch devices 3 and 4 with a tractor indicated at 5,—the hitch device 3 having adjustable connection with the draft bar of the frame whereby its forward end may be raised or lowered to effect vertical adjustment of the forward end of the frame with the tractor. The intermediate portion of the frame is formed to provide a laterally projecting triangular extension 6, the apex of which forms the corner *c* of the triangular frame. The divergent portions of the triangular extension are connected by a brace member 7 and the rear member 8 of said lateral extension forms a short diagonal arm or bar 9, to which the mounting 10 of an earth working disk 11 is secured. The diagonal arm or bar 9 merges into the rear member 12 of the frame, which member is in line with the forward draft member 2 of said frame. At the juncture of the draft member 2 and the forward member of the lateral triangular extension 6, the frame is provided with a laterally and rearwardly projecting arm 13 which is disposed in a horizontal plane parallel with that of the arm or bar 9 and serves to receive the mounting 14 of a forward earth working disk 15.

At the point c forming the apex of the lateral triangular extension 6 of the frame, the yoke 16 of a pivot axle 17 is pivotally connected as indicated at 18,—said axle serving as a mounting for a land wheel 19.

To the rear end member 12 of the frame (which forms the rear corner b of the triangular frame, a bell-crank lever 20 is pivotally connected as indicated at 21,—said bell-crank lever being so disposed that its arm 22 will project upwardly and so that its arm 23 will project rearwardly. The yoke 24 of a pivot axle 25 is connected by a vertical pivot 26 with the rearwardly projecting arm 23 of the bell-crank lever 20, and this pivot axle is received by the hub of a rear furrow wheel 27.

The yoke portion of the pivot axle 24 is provided with a rigid sleeve 28 which forms a pivot bearing for horizontally disposed bell-crank lever 29,—the arm 30 of said lever projecting laterally and the arm 31 projecting forwardly.

To the forward portion of the draft member 2 of the frame 1, two toothed segments 32 and 33 are rigidly secured and to the lower portions of the frames of these segments, the lower end portions of hand levers 34, 35 are pivotally connected,—said levers being thus disposed within convenient reach of an operator seated on the tractor and said levers are provided with suitable manually operable detents to engage the toothed segments for locking said levers in adjusted positions.

A rod 36 (preferably made in two sections adjustably connected by a turn-buckle 37) is connected at its forward end with an intermediate portion of the hand lever 34 and the rear end of this rod is connected, by a ball-and-socket joint indicated at 38, with the lateral arm 30 of the horizontal bell-crank-lever 29. The forwardly projecting arm 31 of the bell-crank-lever 29 has pivotally connected therewith, one end of a rod 39 (preferably made in sections adjustably connected by a turn-buckle 40) and the other end of this rod is pivotally connected with an arm 41 made fast to the yoke portion 16 of the land wheel pivotal axle 17.

It will readily be seen that with the construction and arrangements of parts above described, manipulation of the hand lever 34 will cause angling of the two wheels 19 and 27 or to shift them from angled positions to positions parallel with the line of draft of the plow. By angling the two wheels, the width of the cut made by the earth working gang can be made wider or narrower especially when plowing on a hill-side and the tendency of the plow to drift down hill will be effectually overcome.

The bell-crank lever 20 on which the pivot axle of the rear wheel 27 is mounted, is connected with the hand lever 35, through the medium of a rod or pitman 42—the forward end of the later being pivotally connected with said lever at an intermediate part of the latter and the rear end portion of said rod or pitman is adjustably connected with the upstanding arm 22 of said bell-crank lever 20. A convenient manner in which to provide adjustable connection between the rod or pitman 42 and the arm 22 of the bell-crank 20, is to provide said rod or pitman with a plurality of holes 43, any one of which may receive the pivot pin 44 connecting the same with the lever arm.

It will be understood that by manipulating the hand lever 35, the bell-crank lever 20 may be caused to turn on its pivotal connection with the frame and the latter caused to rise or lower to effect depth of plowing of the earth working disks, and it will be observed that the construction is such that this raising and lowering of the frame will in no way interfere with the angling of the rear wheel when the lever 34 is manipulated and at whatever position of depth of adjustment the plow may be set.

With my improvements, only two wheels are provided, viz—a rear furrow wheel and an intermediate land wheel,—and the raising of the frame for transportation and the raising and lowering to effect depth adjustment is on the rear wheel only (the land wheel or its axle having no vertical movement or adjustment) and both of said wheels may be angled by manually controlled means.

When the lever 35 is operated, the frame will be tilted relatively to the rear wheel, and said frame will be tilted laterally by reason of its loose connection with the tractor, the land wheel acting as a fulcrum on the ground.

Various changes might be made in the details of construction of my invention without departing from the spirit of the latter or limiting its scope and hence I do not wish to restrict myself to the precise details herein set forth.

Having fully described my invention what I claim as new and desire to secure by Letters Patent, is:—

1. The combination with a tractor and a plow frame having loose connection therewith, of a single furrow wheel at the rear of the frame, a single land wheel forwardly of the furrow wheel, and means associated with the axle of the furrow wheel for raising the furrow side of the frame and tilting said frame laterally on its loose connection with the tractor while the land wheel fulcrums on the ground.

2. In a plow structure, the combination of a plow frame, means for loosely connecting the forward end of said frame with a tractor, a single furrow wheel axle at the rear end of the frame, a land wheel axle located forwardly of the furrow wheel, means cooperable with the furrow wheel for raising and lowering the furrow side of the frame and tilting said frame on the land wheel as a fulcrum and on the means for loosely connecting the frame with a tractor.

3. In a plow structure, the combination of a plow frame, means for loosely connecting the forward end of said frame with a tractor, a single rear furrow wheel, a single land wheel, raising and lowering means connected with said frame and said rear furrow wheel for tilting the frame on the land wheel as a fulcrum and on the loose connection means for the frame with a tractor, and means for simultaneously adjusting the angularity of said land and furrow wheels.

4. The combination with a tractor, a plow frame and means loosely connecting said plow frame with the tractor, of a single furrow wheel located at the rear end of the frame, a land wheel forwardly of said furrow wheel, axles for said wheels, a forward hand lever, means controlled by said hand lever and cooperating with said furrow wheel to raise the furrow side of the frame and tilt the latter on the land wheel as a fulcrum and on the loose connection of said frame with the tractor, a second forward hand lever, and means controlled by said second hand lever and cooperable with the axles of the two wheels for angling the latter simultaneously.

5. In a plow structure, the combination with a tractor and a plow frame, of a single furrow wheel, a single land wheel, an adjustable lever connecting said furrow wheel with the rear portion of the frame, means connected with the forward end of the frame and effecting loose vertically adjustable connection of the frame with the tractor, and operating means connected with said adjustable lever whereby the frame may be raised or lowered on the rear wheel and caused to tilt on the land wheel as a fulcrum and on the connection of the frame with the tractor.

6. In a plow, the combination with a frame, of a land wheel, an axle for said wheel connected with said frame to permit said wheel to be angled relatively to the line of draft, a lever connected with the rear portion of the frame by a horizontal pivot and having two arms, a rear furrow wheel, a pivot axle for said rear furrow wheel connected with one arm of said lever whereby said rear furrow wheel may be angled relatively to the line of draft, two hand levers at the forward portion of the frame, connections between one of said hand levers and an arm of the lever at the rear end of the frame, and connections between the other hand lever and the axles of the land and rear furrow wheels for angling said wheels.

7. In a plow, the combination with a frame and earth engaging elements carried thereby, of a single land wheel, an axle for said land wheel having pivot connection with the frame, a rear wheel, a pivot axle for said rear wheel, a hand lever at the forward portion of the frame, a bell crank secured to the pivot axle of the rear wheel, a connection between one arm of said bell-crank and said hand lever, an arm rigid with the pivot axle of the land wheel, and a connection between the other arm of said bell-crank and said last-mentioned arm.

8. In a plow, the combination with a frame and earth working means attached thereto, of a single land wheel, a pivotal axle for said land wheel, an arm rigid with said pivot axle, a rear wheel, a pivot axle for said rear wheel, a bell crank secured to said last mentioned pivot axle, a hand lever, a connection between said hand lever and one arm of said bell crank, a connection between the other arm of said bell crank and the arm on the pivot axle of the land wheel, and manually operable means cooperable with the rear wheel and the frame for raising and lowering the latter.

9. In a plow, the combination with a frame, earth working means attached thereto, and a land wheel, of a bell crank lever connected with the rear portion of the frame by a horizontal pivot, one arm of said lever projecting upwardly and the other arm projecting rearwardly, a rear wheel, an axle for said rear wheel connected with the rearwardly projecting arm of said bell-crank, a hand lever at the forward portion of the frame, and a rod or pitman connecting said hand lever with the upwardly projecting arm of said bell crank.

10. In a plow, the combination with a frame, earth-working means connected therewith, a land wheel, a pivot axle for said land wheel, and an arm on said pivot axle, of a bell crank connected with the rear portion of the frame by a horizontal pivot, a rear wheel, a pivot axle for said rear wheel connected with an arm of said bell crank, a hand lever, a connection between said hand lever and the other arm of said bell crank, a horizontal bell crank secured to the pivotal axle of the rear wheel, a second hand lever, a rod connected at one end with said second lever and having a universal connection at its other end with one arm of said horizontal bell-crank, and a connection between the other arm of said horizontal bell crank and the arm on the pivot axle of the land wheel.

11. In a plow, the combination of a frame having a general triangular shape and including a laterally projecting intermediate member, a forwardly projecting draft member and diagonal members, earth working means attached to said diagonal members of the frame, a single land wheel, a pivotal axle for the land wheel attached to the laterally projecting intermediate member of the frame, a rear wheel, a pivot axle for the rear wheel, means connecting said last-mentioned pivot axle with the rear portion of the frame, a hand lever attached to the forward draft member of the frame, connections between said hand lever and the rear pivot axle and connections between the rear pivot axle and the pivot axle of the land wheel.

In testimony whereof, I have signed this specification in the presence of two subscribing witnesses.

AUGUSTA P. McKAY.

Witnesses:
A. F. DOUGHTY,
RUDOLPH J. ALTGELT.